US012254649B2

(12) United States Patent
Bresciani et al.

(10) Patent No.: US 12,254,649 B2
(45) Date of Patent: Mar. 18, 2025

(54) OPTICAL FLOW ODOMETRY BASED ON OPTICAL MOUSE SENSOR TECHNOLOGY

(71) Applicant: Thales Alenia Space Italia S.p.A. Con Unico Socio, Rome (IT)

(72) Inventors: Fulvio Bresciani, Turin (IT); Giorgio Fasano, Turin (IT)

(73) Assignee: Thales Alenia Space Italia S.P.A. Con Unico Socio, Rome (IT)

(*) Notice: Subject to any disclaimer, the term of this patent is extended or adjusted under 35 U.S.C. 154(b) by 380 days.

(21) Appl. No.: 17/629,625

(22) PCT Filed: Jul. 24, 2020

(86) PCT No.: PCT/IB2020/057021
§ 371 (c)(1),
(2) Date: Jan. 24, 2022

(87) PCT Pub. No.: WO2021/014423
PCT Pub. Date: Jan. 28, 2021

(65) Prior Publication Data
US 2022/0254061 A1    Aug. 11, 2022

(30) Foreign Application Priority Data
Jul. 24, 2019 (IT) .................. 102019000012777

(51) Int. Cl.
*G06T 7/73* (2017.01)
*B64G 1/66* (2006.01)
(Continued)

(52) U.S. Cl.
CPC .................. *G06T 7/73* (2017.01); *B64G 1/66* (2013.01); *G06T 7/60* (2013.01); *G06T 7/74* (2017.01);
(Continued)

(58) Field of Classification Search
CPC .... G06T 7/60; G06T 7/70; G06T 7/73; G06T 7/74; G06V 20/10; G06V 20/56; G06V 20/147; B64G 1/66
See application file for complete search history.

(56) References Cited

U.S. PATENT DOCUMENTS

2004/0221790 A1    11/2004    Sinclair et al.
2006/0209015 A1    9/2006    Feldmeir et al.
(Continued)

FOREIGN PATENT DOCUMENTS

WO    WO 2017/174250 A1    10/2017

OTHER PUBLICATIONS

PCT International Search Report and Written Opinion dated Oct. 22, 2020 for PCT Application No. PCT/IB2020/057021.
PCT/IB2020/057021, Jul. 24, 2020, WO 2021/014423 A1.

*Primary Examiner* — Daniel G Mariam
(74) *Attorney, Agent, or Firm* — McCarter & English, LLP

(57) ABSTRACT

An optical flow odometer to determine the position of an object movable relatively to a surface is provided that includes a cluster of digital image sensors intended to be arranged on the movable object at respective reference positions and an electronic processing and control unit electrically connected with the digital image sensors and configured to: operate the digital image sensors in subsequent time instants during movement of the movable object so as to carry out a sequence of multiple digital image capture operations, in each of which the digital image sensors are operated to simultaneously capture respective digital images, and receive from the digital image sensors and process the digital images captured in the multiple digital image capture operations to compute either the positions of the individual digital image sensors or the position of the cluster of digital image sensors at one or more (Continued)

of the multiple digital image capture operations, and compute the position of the movable object at one or more multiple digital image capture operations based on either the positions of one or more individual digital image sensors or the position of the cluster of digital image sensors computed at one or more multiple digital image capture operations.

13 Claims, 10 Drawing Sheets

(51) Int. Cl.
    *G06T 7/60*     (2017.01)
    *G06V 10/147*     (2022.01)
    *G06V 20/10*     (2022.01)
    *G06V 20/56*     (2022.01)

(52) U.S. Cl.
    CPC ............ *G06V 10/147* (2022.01); *G06V 20/10* (2022.01); *G06V 20/56* (2022.01); *G06T 2207/10016* (2013.01); *G06T 2207/30244* (2013.01); *G06T 2207/30252* (2013.01)

(56) References Cited

U.S. PATENT DOCUMENTS

2014/0247352 A1     9/2014   Rathi et al.
2020/0174489 A1*   6/2020   Jung .................... G05D 1/0221

\* cited by examiner

OPTICAL FLOW ODOMETRY BASED ON OPTICAL MOUSE SENSOR TECHNOLOGY

CROSS-REFERENCE TO RELATED APPLICATIONS

This patent application is a 35 U.S.C. § 371 National Stage filing of International Application No. PCT/IB2020/057021, filed on Jul. 24, 2020, which patent application claims priority to the Italian patent application No. 102019000012777 filed on Jul. 24, 2019, the entire content of which is herein incorporated by reference.

TECHNICAL FIELD

The present invention generally relates to odometry, and in particular to optical flow odometry based on optical mouse sensor technology.

The present invention find advantageous, although not exclusive, application to the spatial sector, in particular to robotic navigation, both wheeled and legged, indoor and outdoor. In particular, the present invention find advantageous, though not exclusive, application on rovers (or astromobiles) intended for celestial body exploration, which the following description will explicitly refer to without losing its general character.

The present invention may find application to various non-spatial sectors, for example to Automated/Automatic Guided Vehicles (AGV) for indoor applications, on road and rail vehicles, for exploring and re-mapping old piping, etc.

BACKGROUND ART

As is known, odometry, a word composed of the Greek words odos (path) e metron (measure), is the use of data coming from movement sensors to estimate a change of position over time.

Odometry is used in the robotic field to determine the position of legged or wheeled robots relative to a starting position.

Dille, M.; Grocholsky, B.; Singh, S. "*Outdoor Downward facing Optical Flow Odometry with Commodity Sensors*", Field and Service Robotics, July 2009, vol. 62, pp. 1-10, and in Ross, R.; Devlin, J.; Wang, S. "*Toward refocused optical mouse sensors for outdoor optical flow odometry*", Sensors Journal, IEEE, 12(6):1925-1932, June 2012, suggests carrying out 2D displacement optical measurements be means of optical mouse sensors.

As is known, optical mouse sensors are small, cost-effective and contactless sensors that integrate on an electronic printed circuit board (PCB) a set of optical and electronic components comprising a light source, typically in the form of LEDs (Light-Emitting Diodes), a light detector, such as a photodiode array or, more commonly, a CMOS (Complementary Metal-Oxide-Semiconductor) sensor, also known as APS (Active Pixel Sensor), a suitable optics, and a digital signal processing (DSP) hardware, usually in the form of a microprocessor, programmed to operate the light source to illuminate those areas that are to be digitally imaged and to acquire and process the captured digital images to compute 2D displacements.

In particular, "*Outdoor Downward-facing Optical Flow Odometry with Commodity Sensors*" suggests combining a visual odometric system based on optical mouse sensor technology with an inertial measurement technology to measure the speed of a field robotic vehicle, such as a rover, in GPS-denied or highly slippery environments.

This combined optical-inertial odometric technology is declared providing 2-D displacement optical measurements with higher precisions than those achievable by wheeled odometric technologies and are perceptibly more appreciated than those provided by a high-end GPS-INS system (Global Positioning System-Inertial Navigation System).

"*Toward refocused optical mouse sensors for outdoor optical flow odometry*" suggest two approaches to mitigate systematic errors affecting horizontal movement optical measuring based on optical mouse sensors and caused by the variation of the vertical height of the measuring instrument relative to the ground.

US 2004/221790 A1 discloses an optical odometry method and apparatus which inexpensively facilitate diverse applications including indoor/outdoor vehicle tracking in secure areas, industrial and home robot navigation, automated steering and navigation of autonomous farm vehicles, shopping cart navigation and tracking, and automotive anti-lock braking systems. In a preferred low-cost embodiment, a telecentric lens is used with an optical computer mouse chip and a microprocessor. In a two-sensor embodiment, both rotation and translation are accurately measured.

US 2006/209015 A1 discloses an optical navigation system comprising an image sensor capable of optical coupling to a surface of an object, a data storage device, and a navigation circuit. The image sensor includes multiple photosensitive elements with the number of photosensitive elements disposed in a first direction greater than the number of photosensitive elements disposed in a second direction. The second direction is perpendicular to the first direction. The image sensor is capable of capturing successive images of areas of the surface, the areas located along an axis parallel to the first direction. The data storage device is capable of storing the captured images. The navigation circuit includes a first digital circuit for determining an estimate for the relative displacement between the image sensor and the object along the axis obtained by comparing the image captured subsequent to the displacement to the image captured previous to the displacement.

WO 2017/174250 A1 discloses a method for determining mounting positions and/or orientations of multiple cameras of a camera system of a vehicle, the cameras being arranged on the vehicle and having different mounting positions and/or orientations. The images are captured by the cameras and the mounting positions and/or orientations of the cameras are determined by means of image processing of the captured images.

OBJECT AND SUMMARY OF THE INVENTION

The Applicant has experienced, as the two above-mentioned articles confirm, that odometric technology based on mouse sensors is particularly sensitive to errors due to integration of speed measurements over time to provide position estimates. In order for it to be effectively adopted, in most cases, odometry requires collecting and processing data rapidly and accurately, as well as calibrating the measuring instrument.

In particular, as emerges from article "*Outdoor Downward-facing Optical Flow Odometry with Commodity Sensors*", in order to compute trajectory, direction and speed of a planetary mission Rover using odometric systems based on optical mouse sensor technology, a problem exists that this technology cannot presently be used alone, but requires the assistance of other odometric technologies, in the above-considered example the inertial one, that are in any case expensive and result in a loss of the simplicity and cost-effectiveness advantages belonging to the optical mouse sensor technology.

In fact, it derives from the article that the operating principle of the odometry based on the optical mouse sensor technology is based on computing cross-correlations between subsequent digital images which, while the rover moves, are similar though different because the rover changed its position. This computing outputs a set of maximum or peak values which individually define the rover position and together define the rover trajectory and speed and each of which is displaced relative to the preceding peak of an amount proportionate to the displacement of the rover within the time range between two subsequently captured digital images.

However, the odometry based on the optical mouse sensor technology operates at a frequency of about 1000 Hz, i.e., it captures and computes the cross-correlation of about 1000 digital images per second, and hence even in a short journey of the rover of few tens of centimetres a discreet likelihood exists that a digital image can be defectively captured or stored or that meanwhile the plane on which the rover is travelling has changed slightly, therefore this technology can miscompute the rover position based on the defectively captured digital image that cannot be corrected and thus this error sums up to previous errors.

Even in computer optical mice this computing error may occur, causing a not perfect match between the path of the optical mouse on the pad and the path of the corresponding arrow displayed on the screen, but this error is totally unconsciously corrected by the user, who takes the arrow displayed on the screen to the target point.

The article fails to suggest how this error can be corrected, concluding with a statistic on errors summed up in different operating situations and stating that the technology, unlike other ones, is in any case useful as it has a sub-millimetric precision, even if it must be recalibrated from time to time by means of an odometric system based on panoramic cameras (PamCam), which is even less precise and very expensive and is able to re-calculate each time its position thanks to absolute references on the ground such as mountains, craters, etcetera.

The present invention aims at providing an optical flow odometer based on optical mouse sensor technology and that allows the drawbacks of the above-described prior art technologies to be to overcome, in particular that fails to require to be aided by additional odometric systems, so as to increase competitiveness of the optical flow odometer in terms of costs and technological and application simplicity.

According to the present invention, an optical flow odometer and a vehicle provided with such an optical flow odometer are provided, as claimed in the appended claims.

DETAILED DESCRIPTION OF PREFERRED EMBODIMENTS OF THE INVENTION

Figure 1:
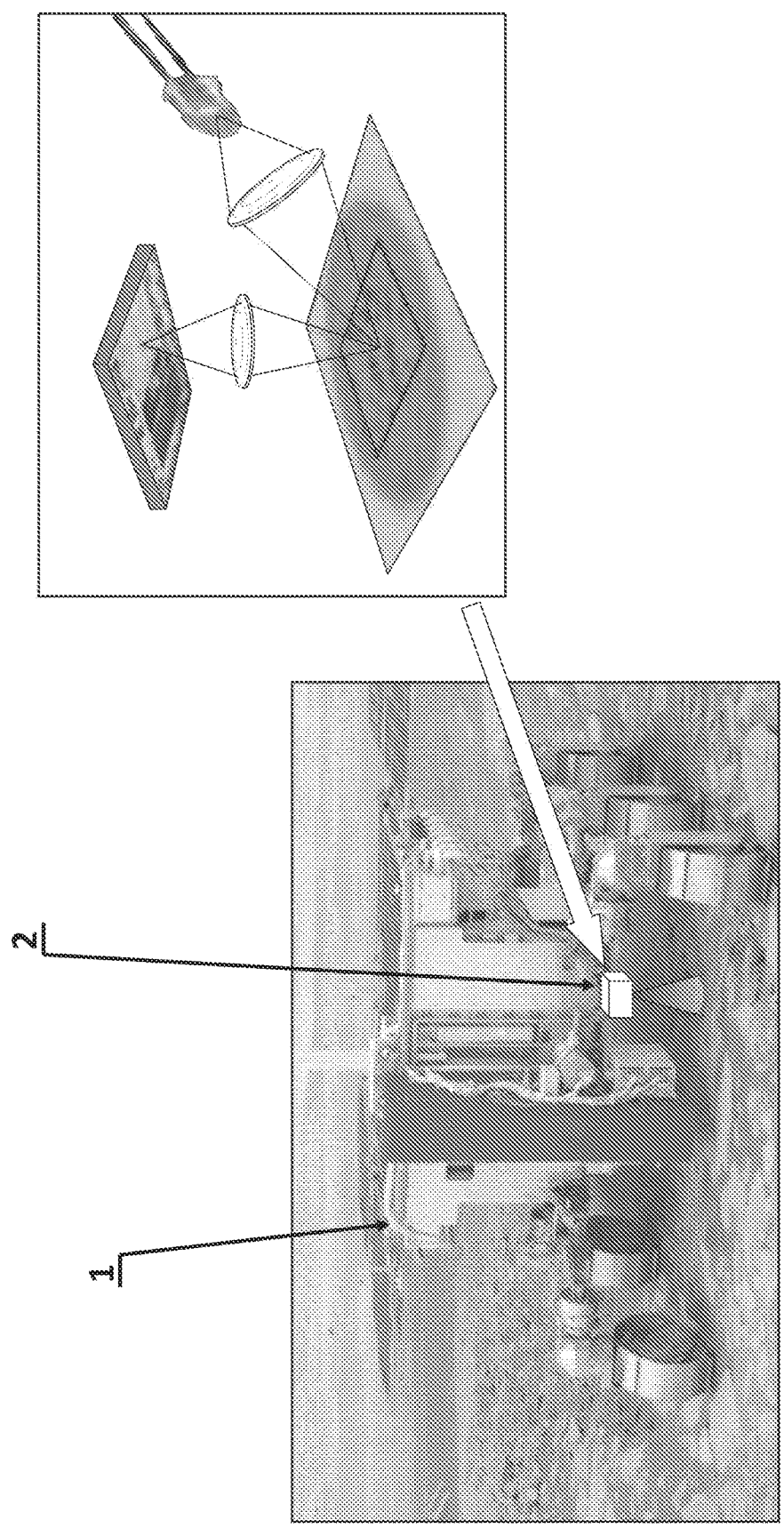
FIG. 1 shows a rover equipped with a downward-facing optical flow odometer made according to the present invention.

The present invention will now be described in detail with reference to the accompanying figures to allow a skilled person to make and use it. Various modifications of the embodiment described will be immediately clear to the skilled person and the general principles disclosed can be applied to other embodiments and applications without departing from the protection scope of the present invention, as defined in the enclosed drawings. Therefore, the present invention shall not be limited to the illustrated and described embodiments, but it must be granted the widest protection scope in accordance with the features disclosed and claimed.

Unless otherwise defined, all the herein used technical and scientific terms have the same meaning commonly used by the ordinary skilled in the art of the present invention. In case of conflict, the present invention, including definitions provided, will be binding. Furthermore, the examples are provided for merely illustrative purposes and must not be regarded as limiting.

In particular, the block diagrams included in the enclosed figures and hereinafter described must not be considered as a representation of the structural features, i.e. construction limitations, but must be construed as a representation of functional features, namely inner properties of the devices and defined by the obtained effects i.e. functional limitations which can be implemented in different ways, so as to protect the functionality thereof (chance of functioning).

In order to facilitate the understanding of the embodiments described, reference will be made to some specific embodiments and a specific language will be used to describe them. The terminology used in the present document aims at describing only particular implementations, and is not intended to limit the scope of the present invention.

As said, the present invention attempts to develop an optical flow odometer based on optical mouse sensor technology and which fails to require the aid of additional odometric systems, such as the inertial ones indicated in one of the two aforementioned articles, as this would extremely increase the optical flow odometry competitiveness in terms of costs and technological and applicative simplicity.

The idea underlying the present invention arises from the analysis of the errors affecting the optical mouse sensor technology mentioned in one of the aforementioned articles.

In particular, this analysis has allowed appreciation that the errors affecting the optical mouse technology are not systematic errors caused by an intrinsic constructional or functioning principle defect, but are random aleatory errors, and, thus, distributed according to a stochastic process.

As a matter of fact, if two optical mice move on parallel trajectories the likelihood that they make similar and simultaneous direction errors is almost zero, and ultimately the result will always be trajectories different from each other with errors that sum up at different times.

The idea to definitely overcome this direction deviation problem without relying on other odometric systems exploits indeed the aforementioned aleatory stochastic nature of the error made by an optical mouse.

As optical mouse sensors are individually very cheap, the idea underlying the present invention is to provide a visual odometric system based on a number of optical mouse sensors rather than on only one optical mouse sensor.

As the likelihood that two optical mouse sensors make defective digital image captures at the same time is very small, and the likelihood that three optical mouse sensors simultaneously make defective digital image captures at the same is near zero, if the number of optical mouse sensors used is sufficiently high, even if two optical mouse sensors simultaneously make defective digital image captures at the same time, the remaining optical mouse sensors, which instead make faultless digital image captures, will allow the position of the visual odometric system to be properly determined with no need for any auxiliary odometric system.

If the issue is approached from a statistical perspective, since, as said, the error of an optical mouse sensor is an aleatory event, let's indicate by p the likelihood that an optical mouse sensor makes a defective digital image capture and, hence, that a local positioning error occurs, and by K the number of defective digital image captures simultaneously occurring in a cluster of n optical mouse sensors synchronizingly operated to capture digital images, where $1<K<n$.

As it is an error stochastic process and applying the permutation formulas of the combinatory computing, the likelihood s that at the same time instant t K optical mouse sensors capture defective digital images will be:

$$s = \frac{n!}{(n_1! \ldots n_k!)} p^n$$

An optical mouse sensor captures digital images and computes a convolution between subsequent digital images with a frequency generally of 125 Hz. Experimental tests indicate that the likelihood that an optical mouse sensor makes a mistake in capturing a digital image is in the worst case of 0.04, i.e., for very different reasons, an average of 4 digital images out of 100 are badly captured and the convolution generates a "noisy" surface curve with no clear maximum peak, thereby in just one second of navigation the trajectory computed by an optical flow odometer with only one optical mouse sensor can make on average as much as 4 defective digital image captures.

Applying the above formula, the likelihood that two optical mouse sensors simultaneously make defective digital image captures at the same time instant t will be:

$$s = \frac{6!}{(2!\,4!)} 0.04^6 = 6.144^{-8}$$

which is a very small value, i.e., a defective digital image capture every 188 days, greatly lower than that with a single optical mouse sensor.

Therefore, even if such an event should occur, i.e., at the same time instant t two optical mouse sensors in a cluster of six optical mouse sensors make simultaneously defective digital image captures (the visual odometric system working on a mission for months), the resulting miscomputation of the rover trajectory could be easily corrected according to two different modes which will be hereinafter described in detail and which represent the two embodiments of the invention.

FIG. 1 exemplarily shows a wheeled robotic vehicle in the form of a rover 1 equipped with an optical flow odometer 2 according to the present invention to compute the position, and, based thereon, the path and speed of the rover 1 during its exploration mission.

Figure 2:
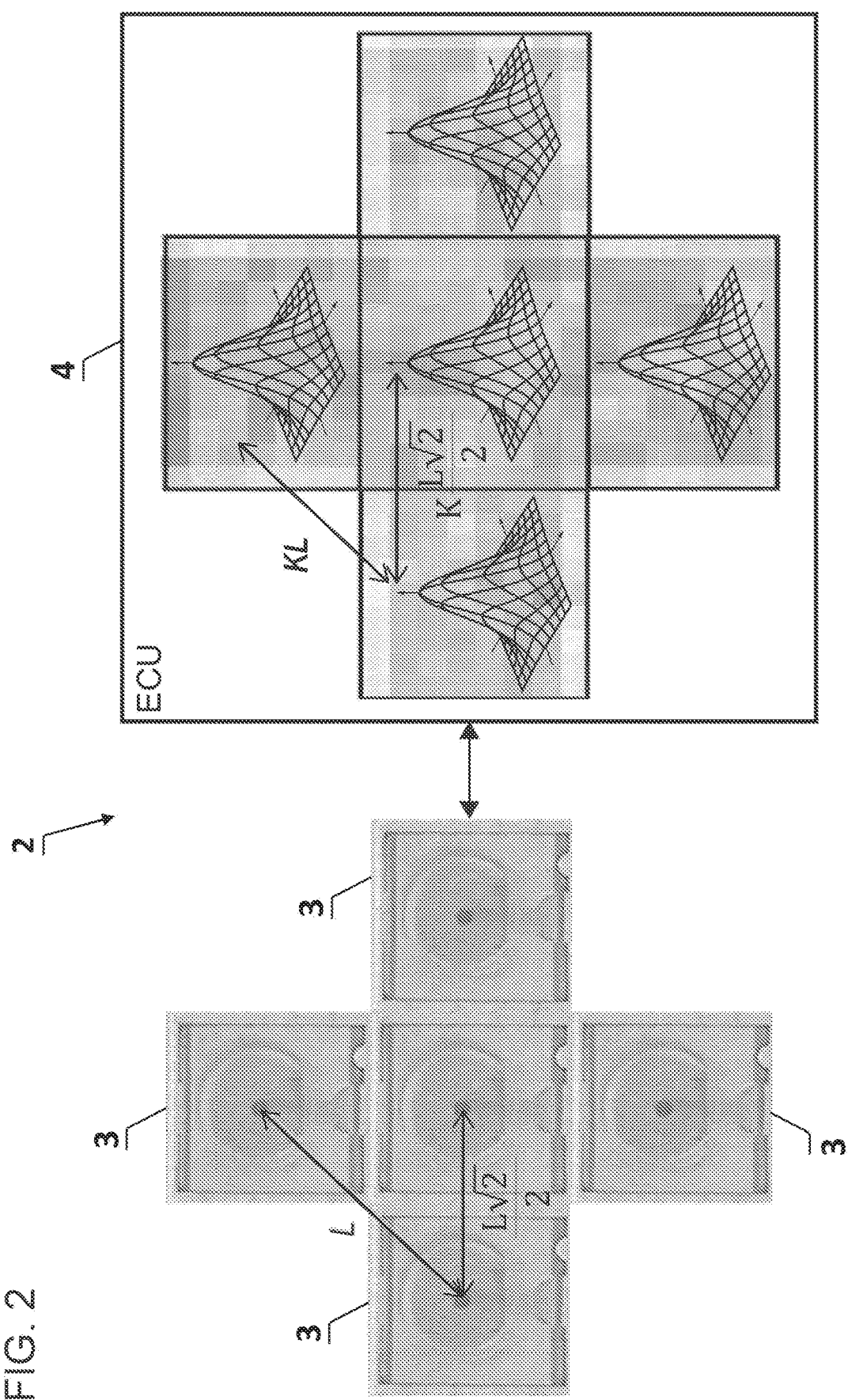
FIG. 2 shows a block diagram of an optical flow odometer according to an embodiment of the invention.
Figure 3:
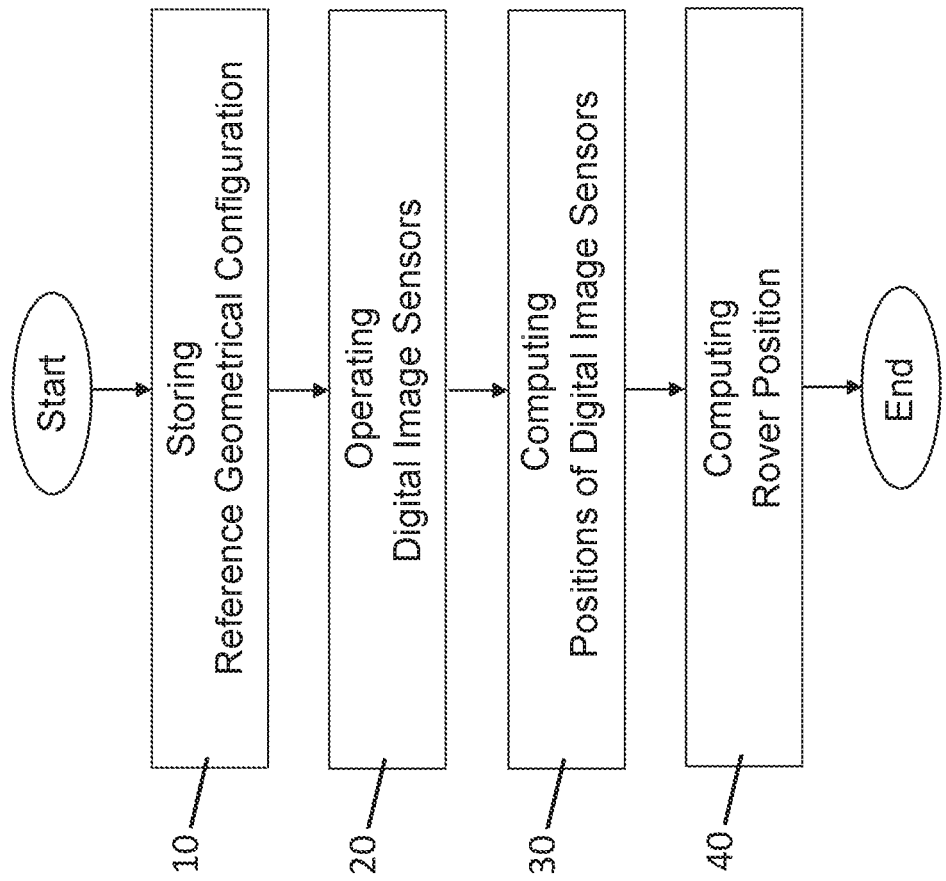
FIG. 3 shows a flow diagram of the operations implemented by an electronic processing and control unit of the optical flow odometer shown in FIG. 2 to compute the rover position.

The optical flow odometer 2 is arranged on the rover 1 facing downwardly, i.e., towards the surface relative to which the rover 1 moves, and, as shown in FIG. 2, it comprises a cluster of digital image sensors 3 and an electronic processing and control unit 4, conveniently in the form of a microprocessor, in communication with the digital image sensors 3 to receive therefrom and process captured digital images to compute the rover position by implementing the operations that will be hereinafter described referring to the flow diagram shown in FIG. 3.

The cluster of digital image sensors 3 and the electronic processing and control unit 4 can be both on board the rover 1, and therefore they can be electrically mutually connected by means of a suitable wiring, or the cluster of digital image sensors 3 can be on board the rover 1, while the electronic processing and control unit 4 can be off board the rover 1 and in communication with the digital image sensors 3 via a suitable communication technology.

The digital image sensors 3 are based on the above-described optical mouse sensor technology, and can be physically distinct, that is, they can each have their own light source, their own light detector, and their own imaging optics that are integrated on an electronic printed circuit board, distinct from those of the other digital image sensors 3, or they can be made so as to share one or more components, for example the light detectors can be all mounted on a single electronic printed circuit board, sharing the imaging optics and/or the light source.

FIG. 2 shows an embodiment in which the digital image sensors 3 are all mounted on the rover 1 in a specific mounting or reference, geometrical or spatial, arrangement or pattern and they are in a number such that, as will be hereinafter described in greater detail, even if two digital image sensors simultaneously make defective digital image captures, it is possible to unequivocally determine which are the digital image sensors that make faultless digital image captures.

In particular, in the embodiment shown in FIG. 2, the digital image sensors 3 are conveniently in a number of five and are arranged in a reference cross-shaped geometrical configuration, in which four of the five digital image sensors 3 are arranged at the ends of the arms of the cross, thus defining a set of peripheral digital image sensors 3, while the fifth digital image sensor 3 is arranged at the intersection of the two arms of the cross, thus being arranged centrally relative to the four peripheral digital image sensors 3.

It goes without saying that the number of the digital image sensors 3 and the geometrical configuration thereof may be different from the above-indicated ones.

The digital image sensors 3 may be mounted on the rover 1 so as to assume fixed positions relative to the rover 1, or they may be mounted on the rover 1 through respective electronically-controllable positioning devices (not shown) operable to allow the positions of the digital image sensors 3 to be adjusted during a step of (re)calibrating/adjusting the optical flow odometer 2, for instance to adapt the mutual distance and/or the mutual geometrical configuration of the digital image sensors 3 to the type of surface or environment where the rover 1 moves, or through a single electronically-controllable positioning device (not shown) common to all the digital image sensors 3, so as to allow the positions of the assembly of the digital image sensors 3 to be (re)calibrated/adjusted, while keeping their mutual geometrical configuration fixed.

With reference to the flowchart shown in FIG. 3, the electronic processing and control unit 4 is programmed to:
  store data representative of the reference geometrical configuration of the digital image sensors 3 (block 10);
  operate the digital image sensors 3 in subsequent time instants during movement of the rover 1 so as to carry out a sequence of multiple digital image capture operations, during each of which the digital image sensors 3 are operated to simultaneously capture respective (low resolution) digital images of the type exemplarily shown in FIG. 2 (block 20);
  receive and process the digital images captured by the digital image sensors 3 in different multiple digital image capture operations to compute, in a reference system of the optical flow odometer 2 and, thus, of the rover 1, and based on the received digital images, the positions of the individual digital image sensors 3 at the time instants in which one or more of the multiple digital image capture operations have been carried out (block 30); and
  compute, always in the reference system of the optical flow odometer 2 and, thus, of the rover 1, the position of the rover 1 at the time instants in which one or more of the multiple digital image capture operations have been carried out and based on one or more of the positions of the individual digital image sensors 3 computed at the same time instants (block 40).

Figure 4:
FIG. 4 shows positions of the digital image sensors computed based on the digital images captured by digital image sensors during following multiple digital image capture operations.

Exemplarily, FIG. 4 shows the positions of the individual digital image sensors 3 computed based on the digital images captured by the digital image sensors 3 in different multiple digital image capture operations and based on which the path and speed of the rover 1 may be computed in a way that is known and is therefore not described herein in detail.

In order for a position of a digital image sensor 3 to be computed at the time instant in which a multiple digital image capture operation is carried out, the electronic processing and control unit 4 is programmed to compute the convolution or the cross-correlation between the digital image captured by the digital image sensor 3 in the multiple digital image capture operation and the digital image captured by the same digital image sensor 3 in one of the previous multiple digital image capture operations, conveniently, though not necessarily, in the immediately preceding multiple digital image capture operation.

As is known, in fact, the convolution or cross-correlation of two digital images outputs a 3D Gauss bell-shaped surface having a shape having a peak in z which is placed at x and y values where the convolution or cross-correlation is maximum and which indicates the movement in x and y of the digital image sensor 3 that captured the two digital images based on which the convolution or cross-correlation is computed.

By contrast, in order for the position of the rover 1 to be to computed at the time instant in which a multiple digital image capture operation is carried out, the electronic processing and control unit 4 is programmed to:
  compare a computed geometrical configuration formed by the positions of the individual digital image sensors 3 computed at the time instant in which the multiple digital image capture operation is carried out with the stored reference geometrical configuration, so as to identify the computed positions of the individual digital image sensors 3 that are offset to, and those that match with, the respective reference positions of the digital image sensors 3 in the reference geometrical configuration; and
  compute the position of the rover 1 based on one or more of the computed positions of the digital image sensors 3 that match with the respective reference positions in the reference geometrical configuration, thus disregarding the computed positions of the digital image sensors 3 that are offset to the respective reference positions in the reference geometrical configuration.

In particular, in order for the position of the rover 1 to be computed at the time instant in which a multiple digital image capture operation is carried out, the electronic processing and control unit 4 can be programmed to take in consideration only one of the computed positions of the digital image sensors 3 which match with the respective reference positions in the reference geometrical configuration, exemplarily, in the reference geometrical configuration shown in FIG. 2, the position of the central digital image sensor 3, or two or more of the computed positions of the digital image sensors 3 which match with the respective reference positions in the reference geometrical configuration.

Figure 5:
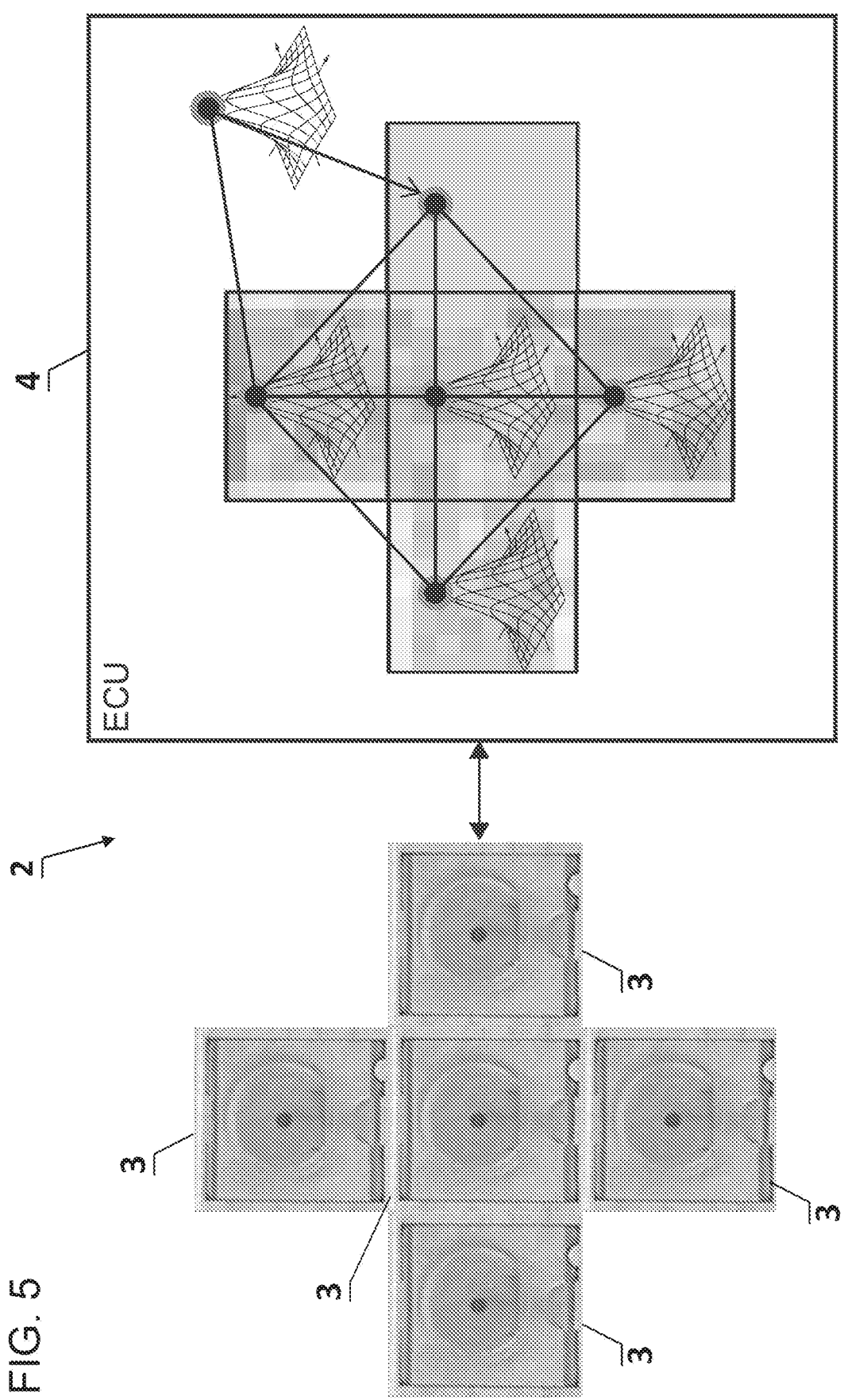
FIG. 5 shows the effect that a single defective digital image capture during a multiple digital image capture operation has on the computation of the positions of the digital image sensors in the embodiment shown in FIG. 2.

The effect that a single defective digital image capture during a multiple digital image capture operation has on the computation of the position of the digital image sensor 3 which makes the defective digital image capture can be appreciated by comparing FIG. 2 with FIG. 5.

In fact, FIG. 2 shows the reference geometrical configuration of the digital image sensors 3 on the rover 1 and a computed geometrical configuration formed by the positions of the positions of digital image sensors 3 computed based on the digital images captured during a multiple digital image capture operation during which no defective digital image capture occurs, while FIG. 5 shows a computed geometrical configuration formed by the positions of the digital image sensors 3 computed based on the digital images captured by digital image sensors 3 during a multiple digital image capture operation during which one defective digital image capture occurs.

As it can be appreciated in FIG. 2, if no defective digital image capture occurs during the digital image capture, the two geometrical configurations, the computed one and the reference one, match in respect of all the digital image sensors 3, apart from a proportionality factor k, i.e., the computed positions of all the digital image sensors 3 in the computed geometrical configuration match with the respective reference positions in the reference geometrical configuration.

By contrast, as it can be appreciated in FIG. 5, if a single defective digital image capture occurs during the digital image capture, the two geometrical configurations, the computed one and the reference one, match only in respect of four digital image sensors 3 out of five, i.e., the computed positions of four digital image sensors 3 in the computed geometrical configuration match with corresponding reference positions in the reference geometrical configuration, while the position of a fifth digital image sensor 3 in the computed geometrical configuration fails to match, in particular is offset to, a corresponding reference position in the reference geometrical configuration.

Thereby, despite one defective digital image capture occurs, the position of the rover 1 can in any case be properly computed based on the computed positions of four digital image sensors 3 in the computed geometrical configuration which match with corresponding reference positions in the reference geometrical configuration.

These considerations are true also when two simultaneous defective digital image captures occur.

Figure 6:
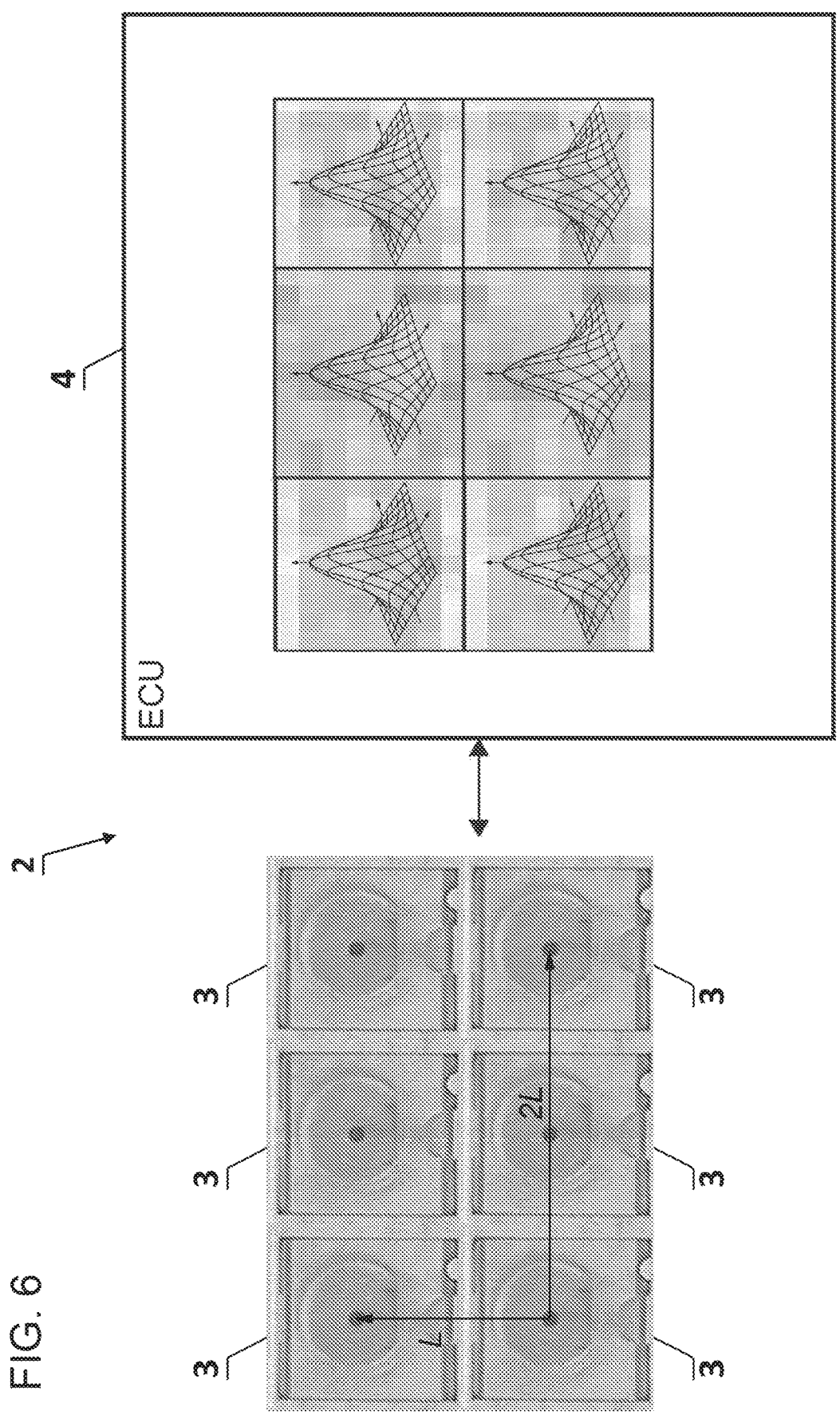
FIG. 6 shows a block diagram of an optical flow odometer according to a different embodiment of the invention.

FIG. 6 shows a block diagram of a different embodiment of the optical flow odometer 2, which differs from the one shown in FIG. 2 in the number of digital image sensors 3 employed, that are six rather than five, and in their geometrical configuration, i.e., rather than being arranged in a cross-shaped geometrical configuration, they are arranged in two lines of three, so as to be placed side by side both horizontally and vertically.

Figure 7:
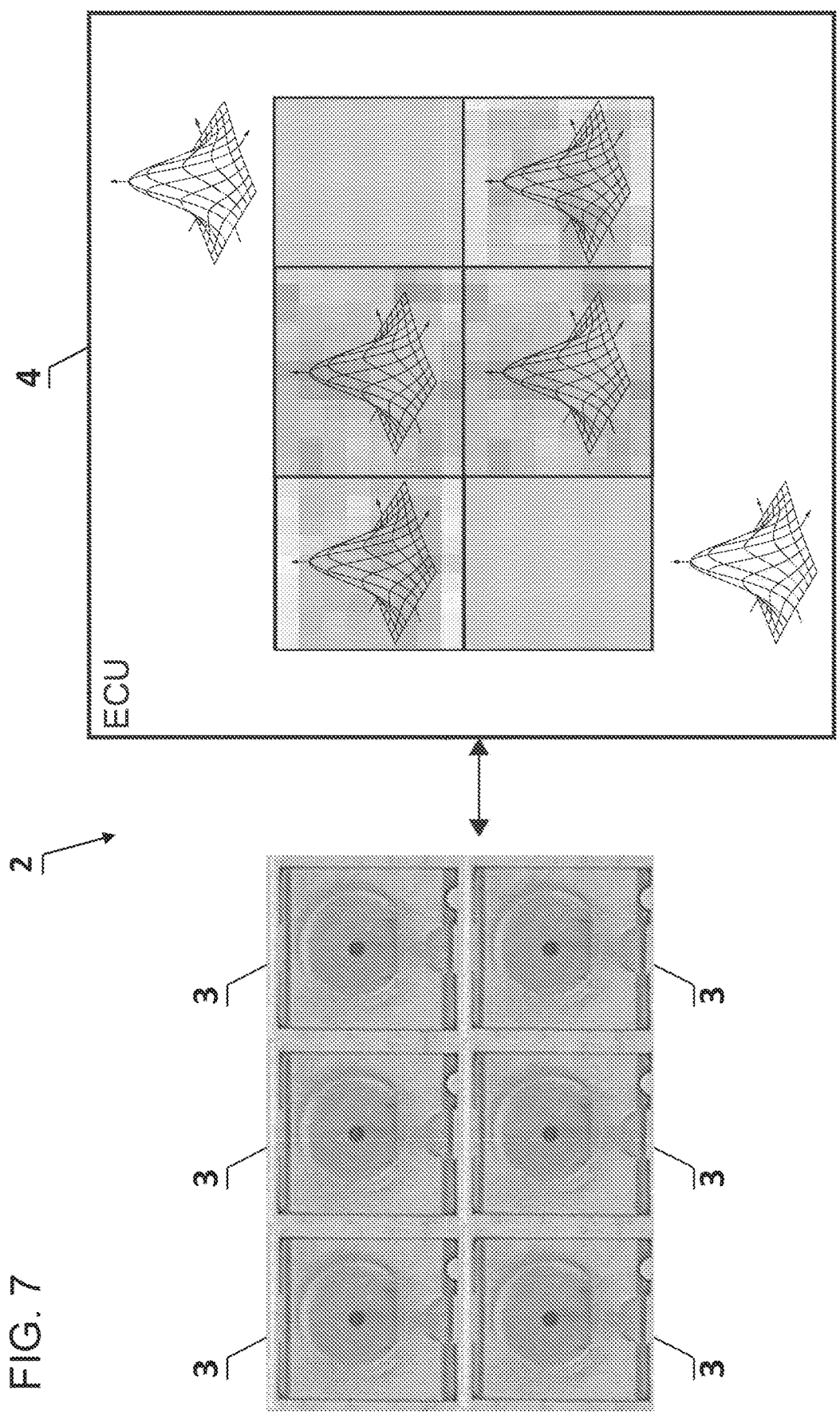
FIG. 7 shows the effect that two simultaneous defective digital image captures during a multiple digital image capture operation has on the computation of the positions of the digital image sensors in the embodiment shown in FIG. 6.

The effect that two simultaneous defective digital image captures occur during a multiple digital image capture operation has in the computation of the positions of the two digital image sensors 3 which make the defective digital image captures can be appreciated by comparing FIG. 6 with FIG. 7.

In fact, FIG. 6 shows the reference geometrical configuration of the digital image sensors 3 and a corresponding computed geometrical configuration of the positions of digital image sensors 3 computed based on the digital images captured during a multiple digital image capture operation during which no defective digital image capture occurs, while FIG. 7 shows a computed geometrical configuration formed by the positions of the digital image sensors 3 computed based on the digital image captured during a multiple digital image capture operation during which two simultaneous defective digital image captures occur, in the example shown the one made by the digital image sensor 3 at the top on the right and the one made by the digital image sensor 3 at the bottom on the left.

As it can instead be appreciated in FIG. 7, when two simultaneous defective digital image captures occur, the two geometrical configurations, the computed one and the reference one, match only in respect of four out of six digital image sensors 3, but in spite of this, the position of the rover 1 can in any case be computed properly based on the computed positions of the digital images sensors 3 in the computed geometrical configuration which match with corresponding reference positions in the reference geometrical configuration.

Figure 8:
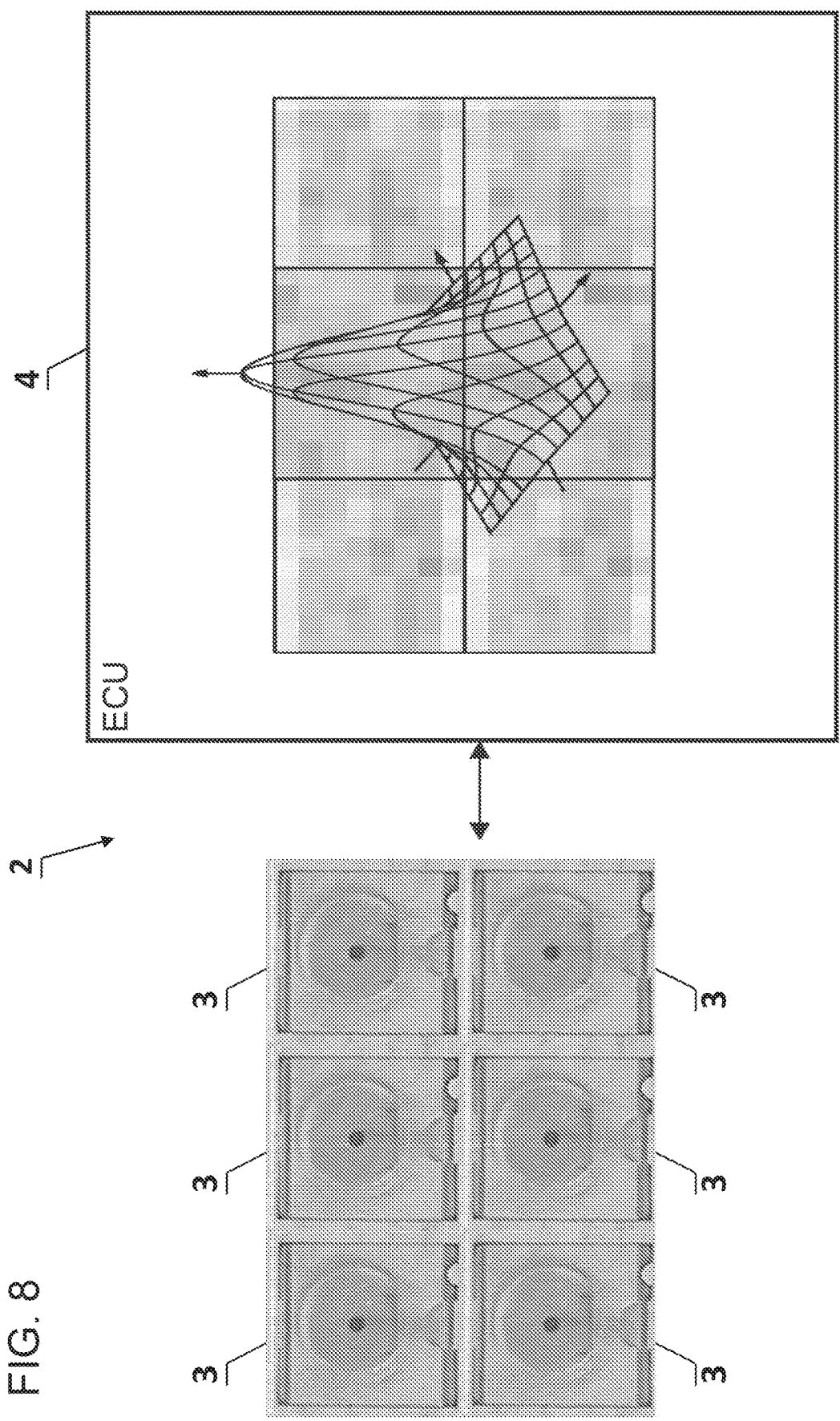
FIG. 8 shows a block diagram of an optical flow odometer according to a further different embodiment of the invention.

In the end, FIG. 8 shows a different embodiment which differs from those described above and shown in FIGS. 2 and 6 in that the optical flow odometer 2 is designed such that its operation is independent from the reference geometrical configuration of the digital image sensors 3.

In particular, in the embodiment shown in FIG. 8, the digital image sensors 3 are six and are arranged in two lines of three, so as to be placed side by side both horizontally and vertically.

In this embodiment as well the number of digital image sensors 3 and their geometrical configuration may be different from the above indicated ones. For example, the number of digital image sensors 3 and their geometrical configuration may be those of the embodiment shown in FIG. 2.

Figure 9:
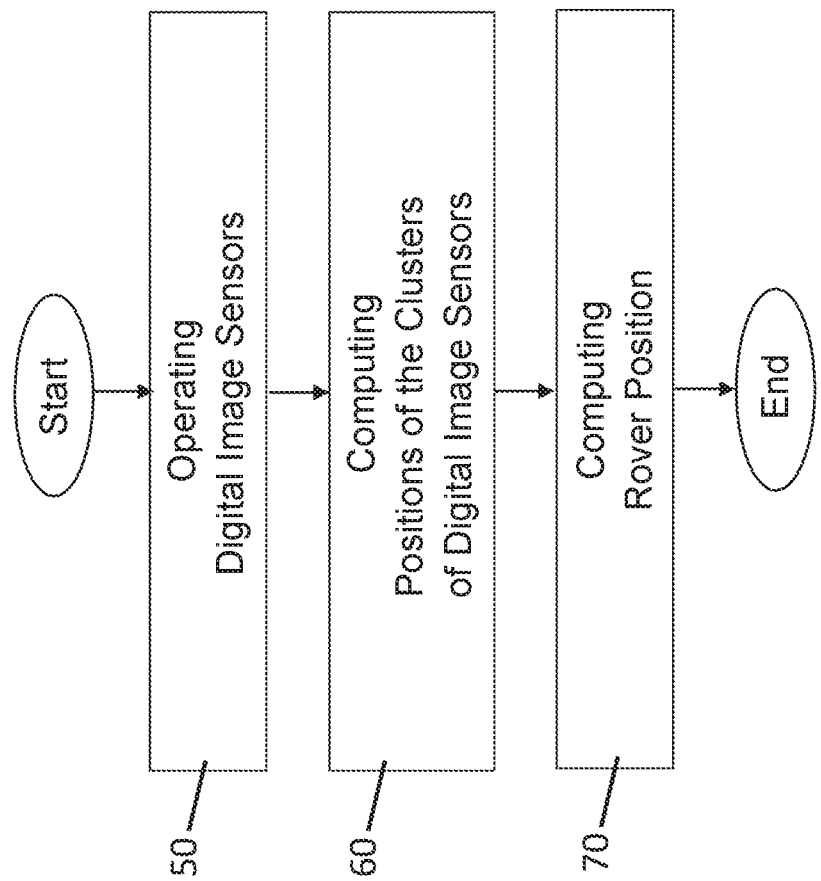
FIG. 9 shows a flow diagram of the operations implemented by an electronic processing and control unit of the optical flow odometer shown in FIG. 8 to compute the rover position.

With reference to the flowchart shown in FIG. 9, in this embodiment the electronic processing and control unit 4 is programmed to:

operate the digital image sensors 3 in subsequent time instants during movement of the rover 1 so as to carry out a sequence of multiple digital image capture operations, in each of which the digital image sensors 3 are operated to simultaneously capture respective (low resolution) digital images of the type exemplarily shown in FIG. 6 (block 50);

receive and process the digital images captured by the digital image sensors 3 in different multiple digital image capture operations to compute, in the reference system of the optical flow odometer 2 and, thus, of the rover 1, and based on the received digital images, the positions of the cluster of digital image sensors 3 at the time instants in which one or more of the multiple digital image capture operations have been carried out (block 60); and compute, always in the reference system of the optical flow odometer 2 and, thus of the rover 1, the positions of the rover 1 at the time instants in which one or more of the multiple digital image capture operations are carried out and based on the positions of the clusters of digital image sensors 3 at the same time instants (block 70).

In particular, differently from the previous embodiments, in which the position of each individual digital image sensor 3 is computed based on the convolution or cross-correlation of the digital images captured by the individual digital image sensor 3, separately from the digital images captured by the other digital image sensors 3, in this embodiment, the electronic processing and control unit 4 is configured to compute the position of the rover 1 during a multiple digital image capture operation based only on the digital images captured by the individual digital image sensors 3 during that multiple digital image capture operation.

In detail, the digital images captured by the individual digital image sensors 3 during a multiple digital image capture operation are jointly used to form a single overall digital image, obtained as the sum of one or more of the captured digital images, and the position of the rover 1 during the multiple digital image capture operation is then computed based on the convolution of the overall digital image thus formed with an overall digital image formed based on digital images captured by digital images sensors 3 during a previous multiple digital image capture operation, conveniently, though not necessarily, during the immediately previous multiple digital image capture operation.

This second embodiment proves to be very powerful and the most rapid to be implemented. As the cluster of k individual digital image sensors 3 is time-synchronised, at each time instant t a single overall digital image is obtained as the sum of k digital images captured by the cluster of k individual digital image sensors 3 and if the digital image captured by each individual digital image sensor 3 is formed of (l×l) pixels, the resulting overall digital image will be of ($k_x l \times k_y l$) pixels, where $k_x$ and $k_y$ are respectively the number of digital image sensors 3 per line and column in the cluster.

It derives from the foregoing that the discretised convolution between two subsequent overall digital images at time t=0 and t=1 is:

$$R_{C01} = C_0 * C_1$$

where the generic element (v,m) of the matrix $R_{C01}$ will be:

$$R_{C01}(v, m) = \sum_{i=1}^{kl} \sum_{j=1}^{kl} C(i, j)_0 C_1(i+v, j+m)$$

The coordinates $\Delta x_1$ $\Delta y_1$ of the maximum of $R_{C01}$ will give the position of the cluster of digital image sensors 3 at the time instant t=1 relative to the previous coordinates $x_0$ $y_0$ at the time instant t=0, the following coordinates $\Delta x_2$ $\Delta y_2$ of the maximum of $R_{C12}$ will give the position of the cluster of digital image sensors 3 at the time instant t=2 relative to the previous coordinates $\Delta x_1$ $\Delta y_1$ at the time instant t=1, and so on thereby:

$$\text{Max}(RC_{01}) \rightarrow \Delta x_1 \Delta y_1$$

$$\text{Max}(RC_{12}) \rightarrow \Delta x_2 \Delta y_2$$

$$\ldots$$

$$\text{Max}(RC_{(n-1)n}) \rightarrow \Delta x_n \Delta y_n$$

In the end, if compared to the initial time instant t=0, the coordinates of the cluster of digital image sensors 3 at the general time instant t=n will be:

$$x_n = \sum_{i=1}^{n} \Delta x_n, \quad y_n = \sum_{i=1}^{n} \Delta y_n$$

By virtue of the property of the convolution, the convolution between two identical digital images outputs a surface function with a maximum of 1 in the geometrical barycentre of the surface function, thereby even if two digital image sensors 3 out of six carry out a defective digital image capture, the maximum of the surface function always remains located in the geometric barycentre, but with a value lower than 1, thus not affecting the relative position of the maximum but just the amplitude thereof, thereby the x, y coordinates of the cluster of digital image sensors 3 are in any case properly computed and fail to adversely affect the trajectory of the rover 1.

Figure 10:
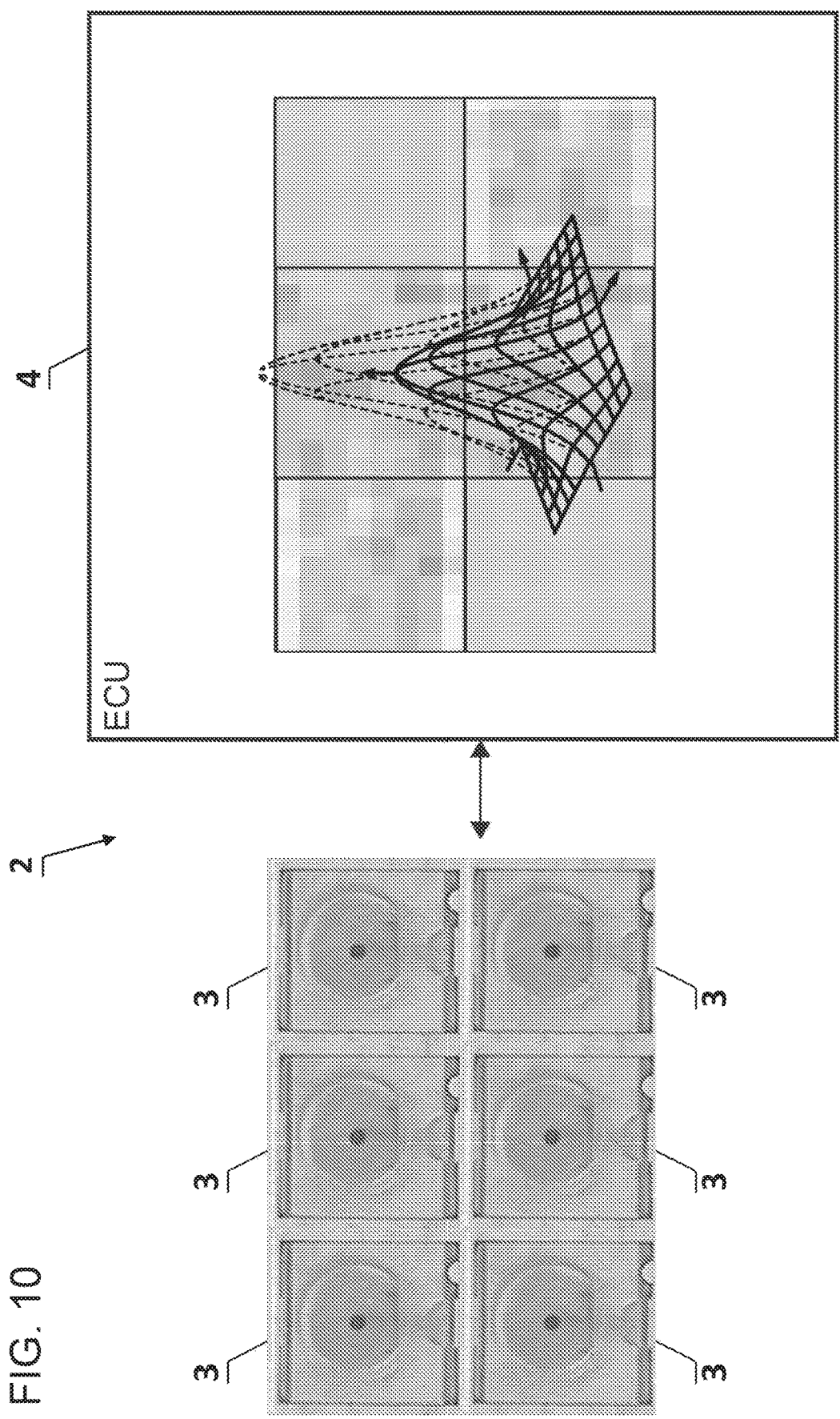
FIG. 10 shows the effect that two simultaneous defective digital image captures during a multiple digital image capture operation has on the computation of the position of a cluster of digital image sensors in the embodiment shown in FIG. 8.

The effect that two simultaneous defective digital image captures has on the computation of the position of the cluster of digital image sensors 3 can be appreciated by comparing FIG. 8 with FIG. 10.

In fact, FIG. 8 graphically shows the surface function computed based on the digital images captured during a multiple digital image capture operation during which no defective digital image capture occurs, while FIG. 10 graphically shows the surface function computed based on digital images captured during a multiple digital image capture operation during which two simultaneous defective digital image captures occur, in the example shown the one made by the digital image sensor 3 at the top on the right and the one made by the digital image sensor 3 at the bottom on the left.

As it can be appreciated in FIG. 10, in which, in order to facilitate the comparison of the surface function with that shown in FIG. 8 the latter is reproduced with a dotted line, in case of two simultaneous defective digital image captures the maximum of the surface function decreases compared to that of the surface function shown in FIG. 8, but its position remains unchanged, thus allowing to properly compute the position of the rover 1.

The foregoing description allows the advantages of the present invention to be appreciated.

In particular, the present invention allows to make an optical flow odometer based on optical mouse sensor technology and which fails to require any auxiliary odometric system, thus making the optical flow odometer competitive with those of the prior art both in terms of costs and in terms of technological and applicative simplicity.

The optical flow odometer based on optical mouse sensors that are small, light, very precise (sub-millimetric precision) and based on a tested technology can be applied to different non-spatial technological sectors such as exploration and re-mapping of old piping, where no GNSS assistance is available, to the automotive field as an aid to the GNSS system, so as to have a higher position precision without the aid of a differential GNSS system, to the field of domestic cleaning and floor-hoovering robots for mapping the floor so as to ensure maximum coverage of cleaning in accessible rooms, to the warehouse field, where forklifts are automatically moved on predefined paths, to the military vehicle field to move on grounds next to sensitive targets and where no radar and radio communications are available.

The optical flow odometer based on optical mouse sensors, being based on a widely tested technology which is not altered but only adapted to other fields of application, is cost-effective both in terms of time and of development and production costs.

Regarding mass production, all the components of the optical flow odometer are easily commercially available and are cheap as they are manufactured for existing technologies produced on a large scale.

Technological simplicity and robust functioning of the "optical motor", even due to large optical mouse production, result in the optical flow odometer being a product that can be easily used in spatial applications and may be assembled on future low cost nano-rovers.

As far as the spatial application is concerned, the optical flow odometer according to the present invention is expected to have a "destructive" impact on the competing technologies presently in use. In fact, the use of the optical flow odometer according to the invention allows the odometric technologies presently used on spatial rovers to be overcome, in particular the highly expensive and complicated visual technologies, even improving performance thereof.

For applications other than the spatial one, the optical flow odometer according to the invention represents an improvement for example in the automotive applications to increase accuracy of GPS navigation devices or totally innovative in all those technical sectors where the coverage of GNSS systems is not available and it can easily take the place thereof (underground tunnels, military operation requiring no radar or communication, etcetera).

The invention claimed is:

1. An optical flow odometer (2) to determine the position of an object (1) movable relative to a surface, comprising:
 a cluster of individual digital image sensors (3) arranged on the movable object (1) in respective reference positions; and
 an electronic processing and control unit (4) in communication with the digital image sensors (3) and configured to:

operate the digital image sensors (3) in successive time instants during movement of the movable object (1) so as to carry out a sequence of multiple digital image capture operations, in each of which the digital image sensors (3) are operated to simultaneously capture respective digital images; and receive from the digital image sensors and process the digital images (3) captured in the multiple digital image capture operations to compute either the positions of the individual digital image sensors (3) or the position of the cluster of digital image sensors (3) at the successive time instant associated with the one or more of the multiple digital image capture operations; and compute the position of the movable object (1) at the successive time instant associated with the one or more multiple digital image capture operations based on either the positions of one or more individual digital image sensors (3) or the position of the cluster of digital image sensors (3) computed at the successive time instant associated with the one or more multiple digital image capture operations wherein the digital image sensors (3) are arranged on the movable object (1) in reference positions according to a reference geometric configuration; and wherein the electronic processing and control unit (4) is further configured to:

store data representative of the reference geometrical configuration of the digital image sensors (3); and compute the position of the movable object (1) at the successive time instant associated with the one or more of the multiple digital image capture operations by:

comparing a computed geometrical configuration formed by the positions of the individual digital image sensors (3) computed at the successive time instant associated with the one or more of the multiple digital image capture operations with the stored reference geometrical configuration, so as to identify those computed positions of the individual digital image sensors (3) that are offset to, and those that match with, the respective reference positions in the reference geometrical configuration; and computing the position of the movable object (1) based on one or more computed positions of the digital image sensors (3) that match with the respective reference positions in the reference geometrical configuration.

2. The optical flow odometer (2) of claim 1, wherein the electronic processing and control unit (4) is further configured to compute the position of a digital image sensor (3) based on a convolution or a cross-correlation between a digital image captured by the digital image sensor (3) during the multiple digital image capture operation and a digital image captured by the digital image sensor (3) during a preceding multiple digital image capture operation.

3. The optical flow odometer (2) of claim 1, wherein the digital image sensors (3) are in a number of five, and the reference geometrical configuration is a cross-shaped geometrical configuration, in which four of the digital image sensors (3) are arranged at the ends of the arms of the cross, while the fifth digital image sensor (3) is arranged at the intersection of the arms of the cross.

4. The optical flow odometer (2) of claim 1, wherein the digital image sensors (3) are based on the optical mouse sensor technology.

5. An object (1) movable relative to a surface, and comprising the optical flow odometer (2) of claim 1 and arranged facing the surface to compute the position of the movable object (1) relative to the surface.

6. An electronic processing and control unit (4) for the optical flow odometer (2) of claim 1 and configured as claimed in claim 1.

7. A non-transitory computer-readable medium storing software loadable in the electronic processing and control unit (4) of the optical flow odometer (2) of claim 1, wherein the software is programmed to cause, when executed, the electronic processing and control unit (4) to become configured as claimed in claim 1.

8. An optical flow odometer (2) to determine the position of an object (1) movable relative to a surface, comprising:

a cluster of individual digital image sensors (3) arranged on the movable object (1) in respective reference positions; and an electronic processing and control unit (4) in communication with the digital image sensors (3) and configured to:

operate the digital image sensors (3) in successive time instants during movement of the movable object (1) so as to carry out a sequence of multiple digital image capture operations, in each of which the digital image sensors (3) are operated to simultaneously capture respective digital images;

receive digital images from the digital image sensors and process the digital images captured in the multiple digital image capture operations to compute either the positions of the individual digital image sensors (3) or the position of the cluster of digital image sensors (3) at the successive time instant associated with the one or more of the multiple digital image capture operations; and compute the position of the movable object (1) at the successive time instant associated with the multiple digital image capture operations based on the digital images captured by the individual digital image sensors (3) at the successive time instant by:

forming an overall digital image based on the digital images captured by the individual digital image sensors (3), wherein the overall digital image is formed based on the digital images captured by the individual digital image sensors (3) during a preceding digital image capture operation, and computing the position of the movable object (1) at the successive time instant based on a convolution of the overall digital image formed based on digital images captured by the individual digital image sensors (3) during the preceding digital image capture operation.

9. The optical flow odometer (2) of claim 8, wherein the digital image sensors (3) are based on the optical mouse sensor technology.

10. An object (1) movable relative to a surface, and comprising the optical flow odometer (2) of claim 8 and arranged facing the surface to compute the position of the movable object (1) relative to the surface.

11. An electronic processing and control unit (4) for the optical flow odometer (2) of claim 5 and configured as claimed in claim 8.

12. A non-transitory computer-readable medium storing software loadable in the electronic processing and control unit (4) of the optical flow odometer (2) of claim 5, wherein the software is programmed to cause, when executed, the electronic processing and control unit (4) to become configured as claimed in claim 8.

13. The optical flow odometer (2) of claim 8, wherein the digital image sensors (3) are in a number of five, and the reference geometrical configuration is a cross-shaped geometrical configuration, in which four of the digital image sensors (3) are arranged at the ends of the arms of the cross, while the fifth digital image sensor (3) is arranged at the intersection of the arms of the cross.

* * * * *